United States Patent [19]

Truhan

[11] 4,201,256
[45] May 6, 1980

[54] SAWDUST COLLECTOR

[76] Inventor: Andrew Truhan, P.O. Box 467, Granite Falls, N.C. 28630

[21] Appl. No.: 2,464

[22] Filed: Jan. 10, 1979

[51] Int. Cl.² .................. B27G 19/00; B26D 7/22; B01D 50/00
[52] U.S. Cl. .................. 144/252 A; 83/100; 51/273; 55/315; 55/340; 55/349; 55/385 R; 55/431
[58] Field of Search .............. 55/315, 337, 338–340, 55/349, 385 R, 431, 432, DIG. 8, DIG. 18; 15/346, 348, 352, 353; 302/21, 22, 27, 57; 83/100; 51/273; 144/252 R, 252 A

[56] References Cited

U.S. PATENT DOCUMENTS

| 2,054,932 | 9/1936 | Fleming | 51/273 |
| 2,230,425 | 2/1941 | Finnegan | 55/432 |
| 2,708,489 | 5/1955 | Stokoe | 55/431 |
| 2,824,610 | 2/1958 | Schubert et al. | 83/100 |
| 2,839,102 | 6/1958 | Kido | 143/157 |
| 3,069,205 | 12/1962 | McIver et al. | 302/17 |
| 3,098,332 | 7/1963 | Sutton | 51/270 |
| 3,203,156 | 8/1965 | McGregor et al. | 55/223 |
| 3,473,300 | 10/1969 | Wilm et al. | 55/302 |
| 3,490,208 | 1/1970 | Meyer et al. | 55/356 |
| 3,809,438 | 5/1974 | Hubbard | 302/22 |
| 3,958,474 | 5/1976 | Kreitz | 83/100 |
| 4,088,164 | 5/1978 | McCord, Jr. | 144/252 R |

FOREIGN PATENT DOCUMENTS

| 75053 | 1/1954 | Netherlands | 55/349 |
| 1329844 | 9/1973 | United Kingdom | 55/385 R |
| 504644 | 4/1976 | U.S.S.R. | 144/252 R |

Primary Examiner—David L. Lacey
Attorney, Agent, or Firm—Harold L. Stowell

[57] ABSTRACT

The invention presented herein is a suction device for removing particles from the cutting area of a cutting tool via a duct arrangement including a large particle separator, a blower, a cyclone separator, a bypass means whereby a portion of the outlet air of the cyclone separator is used as a medium to transport particles separated by said cyclone separator and the remaining air outlet of said cyclone separator is recirculated to the cutting tool in the area of the vacuum pickup means.

5 Claims, 4 Drawing Figures

SAWDUST COLLECTOR

DESCRIPTION

TECHNICAL FIELD

This invention relates to a vacuum cleaner for a woodcutting tool which is adapted to collect wood slivers and dust and transport the collected material via pneumatic conveyor duct means to a sliver collector, cyclone separator, and dust storage bin.

BACKGROUND OF PRIOR ART

A current trend in industry is to improve the environment of the worker to ensure that health hazzards are minimized. In woodworking facilities, this consists of collecting wood particles and dust by a vacuum means in the vicinity of their origin and depositing them in a collection bin. For instance, one early attempt to minimize dust particles in the environment of a radial arm saw consists of modifying the safety cover for the saw blade so it will function as a vacuum collector and incorporating a vacuum collector in the saw table so that sawdust generated on the top of the work piece as well as the bottom of the work piece will be drawn directly into a vacuum transport conduit. The vacuum transport conduit in the prior art devices transports the sawdust and wood chip particles to a collection bin located in close proximity to the saw. The collection bins range in sophistication from a simple filter box to cyclone separators. But in all cases, regardless of the sophistication, a separate storage bin is provided for each woodworking tool. This necessitates a cleanup crew to periodically empty the collectors and results in equipment down time while the dust collectors are being serviced.

In addition to providing vacuum sawdust collectors for radial arm saws, the prior art teaches similar approaches for collecting wood dust from routers, sanders, grinders and all forms of woodcutting tools but in all instances, individual dust collection means, whether it be a filter bag or a cyclone separator, is provided for each tool in the immediate vicinity of the tool. In as much as the sawdust collection means are not 100% efficient, a percentage of the very fine dust particles generated by the woodworking tool escapes the collection bin and pollutes the working environment.

The prior art teaches the benefits of cyclone separators and the concept of incorporating a plurality of separators in a common pneumatic conveyor to connect it so that all of the materials collected from the conveying gas are transported to a common reservoir. However, the prior art fails to apply these principles to an industrial woodworking facility wherein the sawdust is transported via the pneumatic conveyors to a common collection bin remote from the work area.

BRIEF SUMMARY OF THE INVENTION

In view of the various deficiencies found in the prior art wood dust collection systems, it is a primary objective of the invention presented herein to provide a vacuum wood dust and particle collection means at a woodworking tool which functions in combination with a pneumatic conveyor duct that transports the refuse from the work area to a chip and dust separator which collects wood chips and slivers and passes the dust to a cyclone separator via a continuation of the pneumatic conveyor duct. The cyclone separator returns clean air to the woodworking vacuum collection area and bleeds off a portion of the return air to drive a pneumatic conveyor duct which transports the separated dust particles exiting the cyclone converter through a rotary valve to a remote storage bin.

An objective of recirculating the cleaned air leaving the cyclone separator is to provide a wood refuse collection system which recirculates dust particles not removed from the conveying air by the filters and separators through a closed loop dust collection circuit whereby the inefficiencies of the separators will not pollute the environment. A further objective of the recirculating system is to create a condensed dust suspension to transport dust to a dust storage bin located outside of the building housing the woodworking tools. This avoids pollution from the storage bin and the reduced volume of air used in the conveyor minimizes conditioned air loss through the discharge of the air from within the building that is required to transport the wood dust via the pneumatic conveyor duct means. Thus the recirculating principle embodied in the invention minimizes pollution within the work area and conserves energy by minimizing the amount of conditioned air lost in transporting collected dust outside of the work area.

The description of the invention presented herein is directed to a single woodworking tool, but it should be understood that this approach is taken to simplify the presentation. It is comtemplated that the system could be incorporated in a large manufacturing facility wherein numerous woodworking stations are connected to the system in series and parallel. Therefore, it is a further objective of the present invention to provide a dust collection system which is capable of minimizing dust pollution in the atmosphere of a large commercial facility incorporating a number of wood-working tools and transporting wood dust and particles to a storage bin located outside of the building housing the tools by a pneumatic conveyor duct system incorporating a recirculation means that minimizes losses of conditioned air through the system.

The foregoing and other objectives of the invention will become apparent in view of the description of drawings and detailed description of the invention which follows.

DETAILED DESCRIPTION OF THE INVENTION

Figure 1:
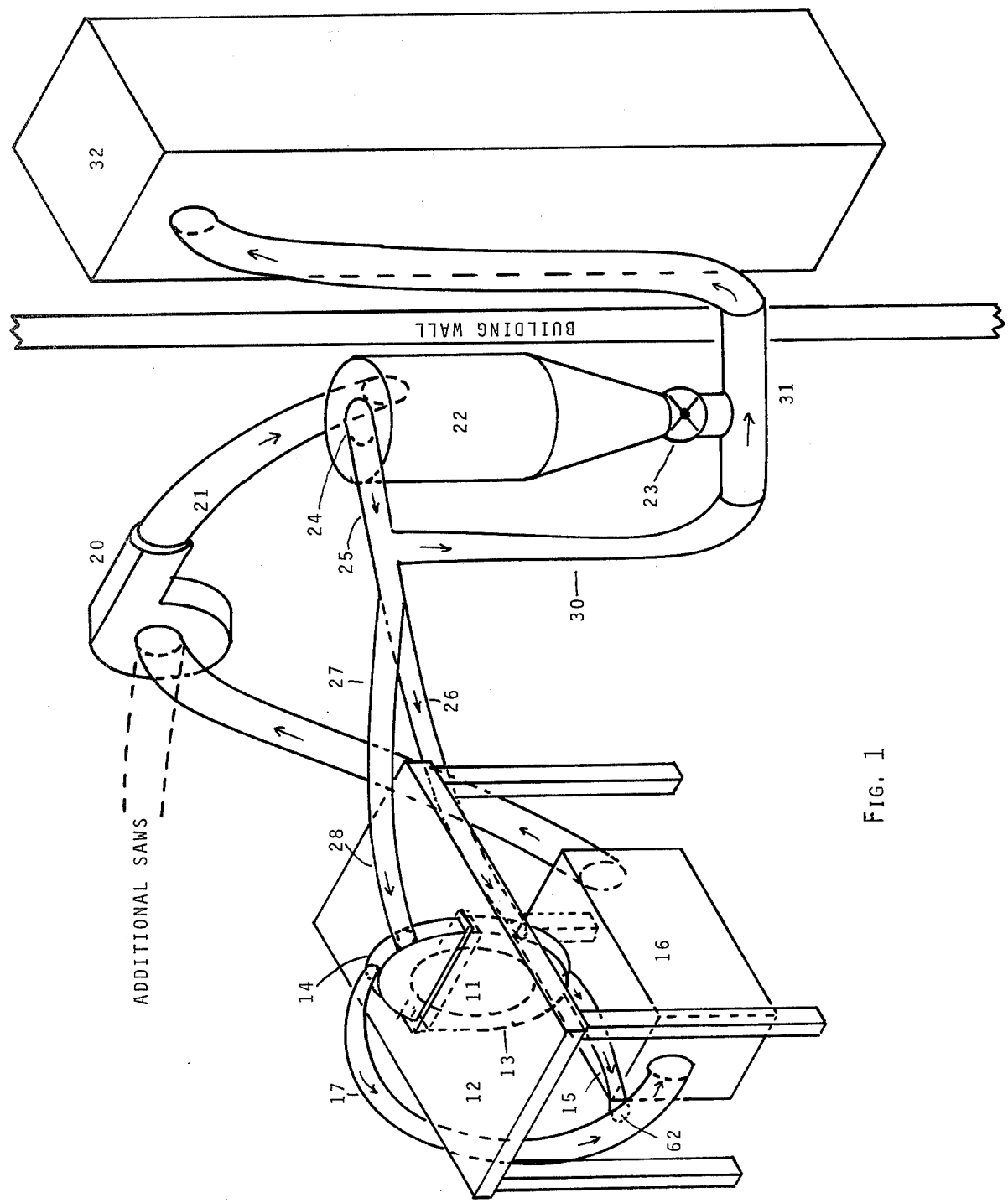
FIG. 1 is a functional diagram of a sawdust collection embodiment of the present invention.

FIG. 1 illustrates an exemplary application of the present invention to a single bench saw which is considered symbolic of any woodcutting tool or a plurality of wood-cutting tools. The saw 10 of FIG. 1 includes a saw blade 11 which is positioned to protrude through an opening in the table 12. A combined safety cover and vacuum duct 13 is positioned around the saw blade under the table and a combined safety cover and vacuum duct 14 is provided on top of the table and positioned so that it will cover the blade 11.

A vacuum conveyor duct 15 couples the lower vacuum duct 13 to the chip and sawdust separator 16 and a pneumatic conveyor conduit 17 couples the upper vacuum duct 14 to the chip and dust separator. Conveyor conduit 17 includes a flexible section 18 which will permit movement of the upper safety hood and vacuum duct 14 to facilitate changing saw blades, positioning the saw blade and passing work pieces over the table.

A fan 20 draws air via conveyor conduit 19 through the chip and dust separator 16 and pneumatic conveyor duct and conduit 15 and 17 to create the vacuum in ducts 13 and 14 which draws in a wood refuse and air from the cutting area. The wood refuse air suspension drawn into fan 20 is discharged into a conveyor duct 21 which transports the dust suspension to the cyclone separator 22. The cyclone separator deposits dust particles on the rotary valve air lock 23 and discharges clean air at the vortex air exit 24. Vortex air exiting at 24 is conveyed by way of clean air conduit 25 to vacuum ducts 13 and 14 through clean air conduits 26 and 27 respectively. Clean air conduit 27 includes a flexible section 28 which permits movement of the upper safety hood and vacuum duct.

Figure 2:
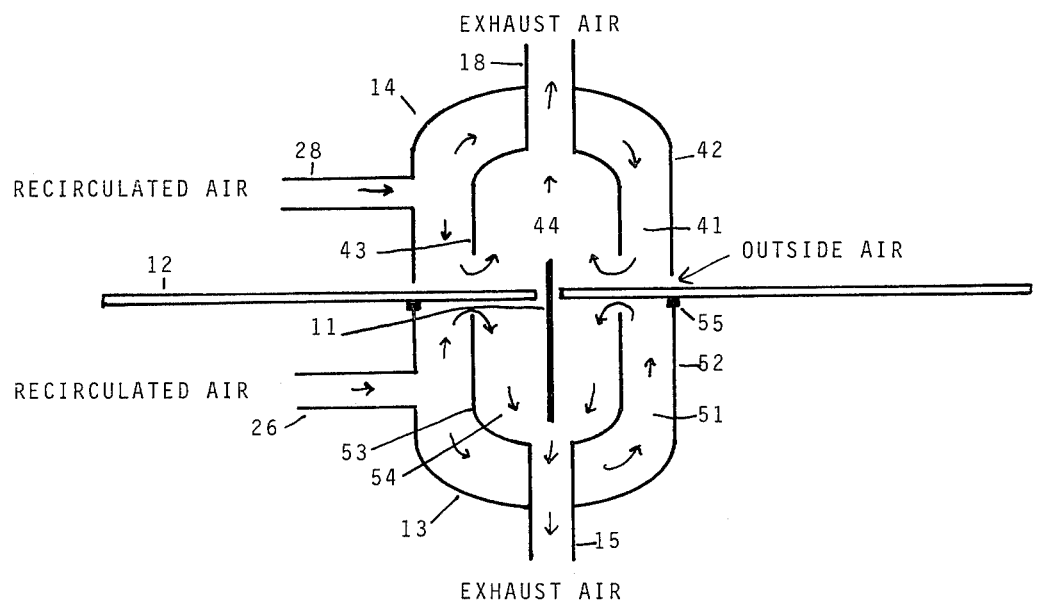
FIG. 2 illustrates the upper and lower dust collection hoods of the present invention.

Vacuum ducts 13 and 14 include a dual air passage, one passage admits clean air from the cyclone separator 22 and channels it past the cutting area where it is returned to the system via the second channel which is the actual vacuum chamber connected to the vacuum conduits leading to the chip and sawdust separator, see FIG. 2.

A portion of the air exiting the cyclone separator at 24 is bled from clean air conduit 25 to provide a fluid to create a suspension of the dust particles that pass through rotary valve 23. This suspension is much denser than the suspension in pneumatic conveyor duct 21. Clean, bleed air travels from clean air conduit 25 through bypass conduit 30 to the duct conveyor conduit 31 wherein a suspension of the separated dust is transported to a storage bin 32 which may be positioned outside of the building. In a typical embodiment, fan 21 produces an air flow of 500 cubic foot per minute. This air flow enters cyclone converter 22 and exits at the vortex air exit 24 at a volume of approximately 500 cubic foot per minute. Approximately 200 cubic foot per minute are bled off via duct 30 and used to transport the separated dust to storage bin 32. The remaining 300 cubic foot per minute is transported via clean air duct 25 to air ducts 26 and 27. Air at the rate of 50 cubic foot per minute flows via ducts 27 and 28 to vacuum duct 14 and the remaining 250 cubic foot per minute flow from conduit 25 flows through conduit 26 to vacuum duct 13. Air from the upper table portion of the saw is drawn into the upper duct 14 at the rate of 50 cubic foot per minute so that pneumatic transport line flexible section 18 has a flow rate of 100 cubic foot per minute due to the combined recycled air from conduit 27 and air from the top of the table. The lower conduit 13 draws in air from the area of the saw blade at a rate of 150 cubic foot per minute so that when combined with the 250 cubic foot per minute supply results in a flow rate in pneumatic conveyor duct 15 of 400 cubic foot per minute.

The recirculating functions of vacuum ducts 13 and 14 can be seen more clearly in FIG. 2. Supply air from the vortex of the cyclone separator travels through conduit 28 and enters the plenum area 41 formed by outer hood 42 and inner hood 43. The air circulates through the plenum and across the table interface at either side of saw blade 11 and is drawn into vacuum chamber 44 and out pneumatic conveyor flexible section duct 18. Additional makeup air is drawn in around the edges of outer hood 42 to offset air lost in transporting the separated sawdust to the remote storage bin 32 of FIG. 1. The lower vacuum duct 13 is similar to the upper duct in that it is comprised of an outer hood 52 and an inner hood 53 which form a plenum 51 through which clean air from conduit 26 flows past the underside of the table 12 and by the saw blade 11 into vacuum duct 54 from where it transports chips and sawdust particles via pneumatic conveyor duct 15 to the chip and sawdust separator 16 of FIG. 1.

The outer hood 52 of the lower vacuum duct 13 may be sealed by any convenient means 55 to the underside of saw table 12 so that all makeup air entering the lower vacuum duct must pass through the saw blade opening in the table and thus serves a dual purpose by cooling the saw blade.

In the flow rate example given with respect to FIG. 1 pneumatic, conveyor duct 15 had a flow rate of 400 cubic foot per minute while conveyor 18 had a flow rate of 100 cubic foot per minute. This flow differential is accomplished by forming the conveyors from duct work having a cross-sectional difference of approximately 4 to 1 wherein pneumatic conveyor duct 15 is 4 times the size of pneumatic conveyor flexible section 18. This ratio is presented as exemplary only for it is intended that the flow rates of the upper and lower vacuum ducts are to be adjusted to meet the needs of the various woodcutting tools contained therebetween and the adjustment is made by designing the system so that the cross-sectional areas of the duct forming the pneumatic conveyors will result in the desired flow rate ratios.

Figure 3:
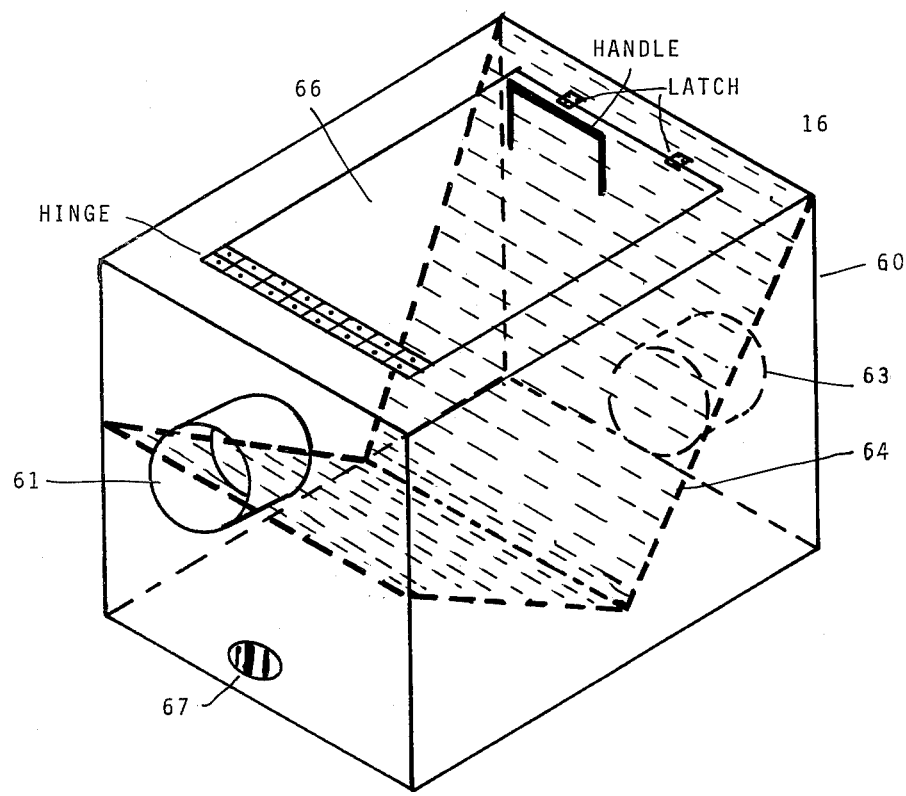
FIG. 3 is a perspective view of the chip and sawdust separator.

FIG. 3 presents the chip and sawdust separator 16 of FIG. 1 in more detail. In the exemplary embodiment, the separator consists of a box 60 which has an inlet duct 61 near the top of one end which is adapted to receive a Y connector 62 which couples pneumatic transport ducts 15 and 17 of FIG. 1 to the separator. An outlet duct 63 is located at the bottom of the box and at the opposite end from the inlet duct 61. The outlet duct is coupled directly to fan 20 or if desired, fan 20 may be remotely located with a duct coupling the separator to the fan. A coarse filter 64 fabricated from wire mesh on a removable frame is located in box 60 so that it separates the inlet 61 from the outlet 63. The openings in the wire mesh are calculated to prevent wood chips and slivers exceeding a predetermined minimum size from passing through the separator and therefore only dust particles smaller than a predetermined diameter will pass through exit 63 in fluid suspension. A door 66 is incorporated in the top of the box so that the separator may be serviced by removing the wood chips from the coarse wire filter with a tool such as a scoop.

A damper 67 is provided in the box 60 of the separator 16 to provide a means to control the air flow rate of the system to facilitate moving trapped particulates.

Figure 4:
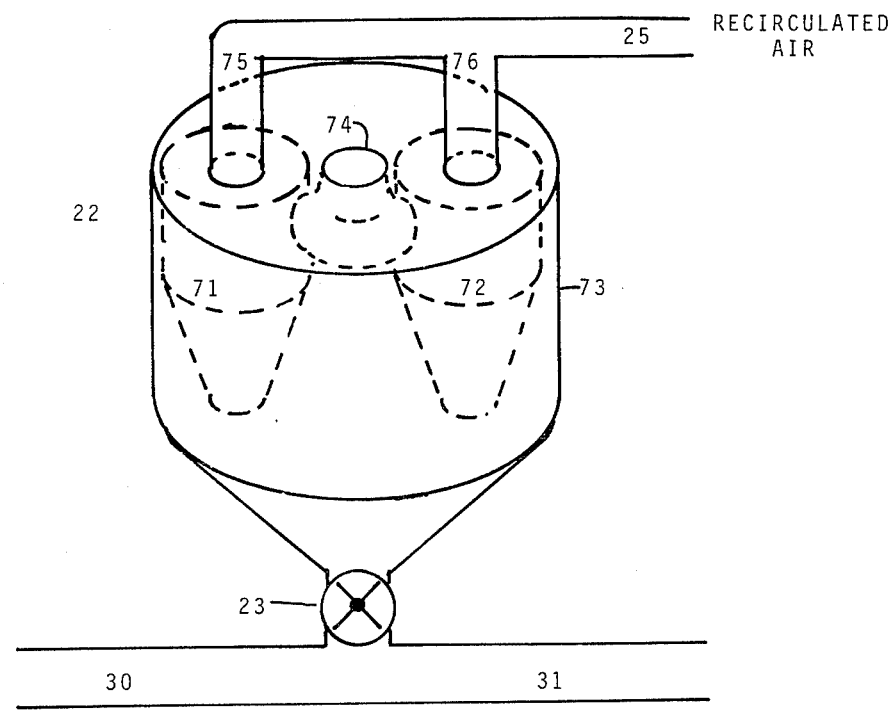
FIG. 4 is a detailed view of a multiple cyclone embodiment of the cyclone air cleaner of the present invention.

FIG. 4 illustrates an embodiment of the present invention wherein two cyclone separators 71 and 72 form cyclone separator 22 of FIG. 1. In this embodiment cyclone separator 71 and 72 are contained within a cyclone separator housing 73 which incorporates an air inlet 74 that is coupled to the duct work forming conveyor duct 21 of FIG. 1. Vortex air from separator 71 exits via a clean air conduit 75 which is coupled to the clean air conduit exit 76 for separator 72. The combined vortex air from both separators 71 and 72 is then coupled to clean air duct 25 of FIG. 1.

The bottom section of housing 73 is conical and functions as a particle collection bin for the multiple cyclone separators 71 and 72. Particles collected in the lower portion of housing 73 are permitted to pass through rotary air lock 23 as the vanes in the air lock rotate as a function of bleed air passing through conduit 30 to conduit 31. As the air flows by the rotary valve, a pressure differential is created which causes the rotary air lock to rotate and deposit dust particles into the air stream flowing to the storage bin via the pneumatic conveyor 31.

STATEMENT OF INDUSTRIAL APPLICATION

This invention provides a means whereby sawdust and wood chips are removed from woodcutting tool areas and transported via pneumatic conveyor ducts to a remotely located storage bin via a system which condenses the sawdust suspension delivered to the storage bin to prevent excessive losses of conditioned air and recirculates clean air through the woodworking tools to improve scavenging and eliminate atmospheric pollution in the work area due to filter inefficiences.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A dust collecting apparatus for a cutting tool, comprising:
    a chip and dust separator;
    chip and dust inlet means for said chip and dust separator;
    gas and dust outlet means for said chip and dust separator;
    a cutting tool safety cover including a vacuum duct and positioned adjacent the cutting area of said cutting tool;
    a vacuum conveyor duct connecting said cutting tool safety cover and said vacuum duct to said inlet means to said chip and dust separator;
    a fan;
    a vacuum conveyor conduit means coupling said gas and dust outlet means of said chip and dust separator to the input of said fan;
    a cyclone separator including an inlet, a clean air outlet, and a particle discharge chute;
    a pneumatic conveyor conduit coupling the output of said fan to said input of said cyclone separator;
    a dust storage container;
    clean air conduit means connected to said clean air outlet and to said cover and said vacuum duct;
    a first conduit coupling said particle discharge chute to said dust storage container;
    a second conduit coupling said clean air conduit means to said first conduit whereby the particles from said particle discharge chute and a portion of the air in said clean air conduit means from said clean air outlet are mixed to form a fluid suspension.

2. A dust collecting apparatus as defined in claim 1 wherein said particle discharge chute of said cyclone separator includes a rotary valve air lock.

3. A dust collecting apparatus as defined in claim 1 wherein said cutting tool safety cover comprises:
    an inner hood encompassing the cutting area of the cutting tool and forming a vacuum chamber coupled to said vacuum duct; and
    an outer hood encompassing said inner hood to form a plenum therebetween whereby air from said clean air conduit means is conveyed to said vacuum chamber.

4. A dust collecting apparatus as defined in claim 3, further comprising a second cutting tool safety cover positioned beneath the cutting area of the cutting tool.

5. A dust collecting apparatus as defined in claim 4 wherein said cyclone separator comprises:
    a gas tight housing;
    a plurality of cyclone air cleaners positioned in said gas tight housing;
    said gas tight housing configured so that the lower section forms a particle collecting bin for receiving particles from said plurality of cyclone air cleaners;
    a rotary air lock positioned in said particle discharge chute of said cyclone separator; and means for combining the clean air vortex outlets of said plurality of cyclone air cleaners.

* * * * *